United States Patent [19]

Tokida et al.

[11] Patent Number: 5,252,417
[45] Date of Patent: Oct. 12, 1993

[54] TITANYL PHTHALOCYANINE CRYSTAL AND ELECTROPHOTOGRAPHIC PHOTORECEPTOR USING THE SAME

[75] Inventors: Akihiko Tokida; Yasuo Sakaguchi; Hidemi Nukada; Kohichi Yamamoto; Katsumi Daimon, all of Kanagawa, Japan

[73] Assignee: Fuji Xerox Co., Ltd., Tokyo, Japan

[21] Appl. No.: 670,788

[22] Filed: Mar. 19, 1991

[30] Foreign Application Priority Data

Mar. 20, 1990 [JP] Japan ................................ 2-68089

[51] Int. Cl.⁵ .............................................. G03G 5/06
[52] U.S. Cl. .......................................... 430/59; 430/78; 430/58
[58] Field of Search ................................ 430/59, 58, 78

[56] References Cited

U.S. PATENT DOCUMENTS

| | | |
|---|---|---|
| 2,770,629 | 1/1952 | Eastes . |
| 3,160,635 | 12/1964 | Knudsen et al. . |
| 3,357,989 | 12/1967 | Byrne et al. . |
| 3,708,292 | 1/1973 | Brach et al. . |
| 4,728,592 | 3/1988 | Ohaku et al. ........................ 430/59 |
| 4,898,799 | 2/1990 | Fujimaki et al. .................... 430/59 |
| 4,994,566 | 2/1991 | Mimura et al. ...................... 430/58 |
| 5,039,586 | 8/1991 | Itami et al. ......................... 430/78 |

FOREIGN PATENT DOCUMENTS

| | | |
|---|---|---|
| 50-38543 | 4/1975 | Japan . |
| 62-67094 | 3/1987 | Japan . |
| 63-20365 | 1/1988 | Japan . |
| 64-17066 | 1/1989 | Japan . |
| 2-8256 | 1/1990 | Japan . |
| 2-28265 | 1/1990 | Japan . |

OTHER PUBLICATIONS

English Language Abstract A-50-38543, Japan.

*Primary Examiner*—Marion E. McCamish
*Assistant Examiner*—Mark A. Chapman
*Attorney, Agent, or Firm*—Finnegan, Henderson, Farabow, Garrett & Dunner

[57] ABSTRACT

A novel titanyl phthalocyanine crystal showing X-ray diffraction peaks at Bragg angles ($2\theta \pm 0.2$) of 27.2°, 24.0°, 18.0°, 14.3°, and 9.5° and an electrophotographic photoreceptor containing the same as a charge generating layer are disclosed. The photoreceptor exhibits high photosensitivity and durability.

12 Claims, 9 Drawing Sheets

TITANYL PHTHALOCYANINE CRYSTAL AND ELECTROPHOTOGRAPHIC PHOTORECEPTOR USING THE SAME

FIELD OF THE INVENTION

This invention relates to a novel crystal of titanyl phthalocyanine useful as a photoconductive material, a process for preparing the same, and an electrophotographic photoreceptor using the same.

BACKGROUND OF THE INVENTION

Various photosensitive materials have been proposed to date for use in an electrophotographic photoreceptor. With respect to a laminate type electrophotographic photoreceptor whose photosensitive layer is composed of a charge generating layer and a charge transporting layer, various organic compounds have been reported as a charge generating material.

Recently, there has been an increasing demand to extend the photosensitive wavelength region of conventional organic photoconductive materials to a longer side (780 to 830 nm) which corresponds to a wavelength region of a semiconductor laser of near infrared light so as to make them applicable to digital recording using a laser printer, etc. From this point of view, there have been reported photoconductive materials for semiconductor lasers, such as squarylium compounds as disclosed in JP-A-49-105536 and JP-A-58-21416, triphenylamine type trisazo compounds as disclosed in JP-A-61-151659, and phthalocyanine compounds as disclosed in JP-A-48-34189 and JPA-57-148745 (the term "JP-A" as used herein means an "unexamined published Japanese patent application").

In cases where an organic photoconductive material is used as a photosensitive material for semiconductor lasers, they are required to have a photosensitive wavelength region extended to a longer side and to provide a photoreceptor having satisfactory sensitivity and durability. None of the above-described conventional organic photoconductive materials sufficiently satisfies these requirements.

In order to overcome the drawbacks of the conventional organic photoconductive materials, the relationship between their crystal form and electrophotographic characteristics has been studied. In particular, many reports have been made on phthalocyanine compounds.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine compounds include α-, ε-, π-, χ-, ρ-, γ-, and δ- forms as well as a stable β-form. These crystal forms are known to be capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, referring to a relationship between the crystal form of copper phthalocyanine and electrophotographic sensitivity, JP-A-50-38543 states that an ε-form has higher sensitivity than any of α-, β-, and γ-forms.

Various crystal forms have been proposed, too, with respect to titanyl phthalocyanine (oxytitanium phthalocyanine). Examples of such crystal forms of titanyl phthalocyanine and electrophotographic photoreceptors using them are described in JP-A-62-67094, JP-A-63-365, and JP-A-64-17066.

However, any of the known phthalocyanine compounds proposed to date is still unsatisfactory in photosensitivity and durability when used as a photosensitive material. It has thus been demanded to develop a phthalocyanine compound of new crystal form.

SUMMARY OF THE INVENTION

An object of the present invention is to provide a new crystal of titanyl phthalocyanine.

Another object of the present invention is to provide a photoconductive material having high photosensitivity and durability which comprises a new crystal of titanyl phthalocyanine and to provide an electrophotographic photoreceptor containing the same.

As a result of extensive investigations, the inventors have found that a titanyl phthalocyanine crystal having a stable crystal form which exhibits high sensitivity and durability as a photoconductive material can be obtained by subjecting titanyl phthalocyanine to a simple treatment, and thus reached the present invention.

The present invention relates to a novel titanyl phthalocyanine crystal showing X-ray diffraction peaks at Bragg angles ($2\theta \pm 0.2$) of 27.2°, 24.0°, 18.0°, 14.3°, and 9.5°.

The titanyl phthalocyanine crystal of the present invention is useful as a photoconductive material to be incorporated into a photosensitive layer to provide an electrophotographic photoreceptor.

DETAILED DESCRIPTION OF THE INVENTION

Figure 1:
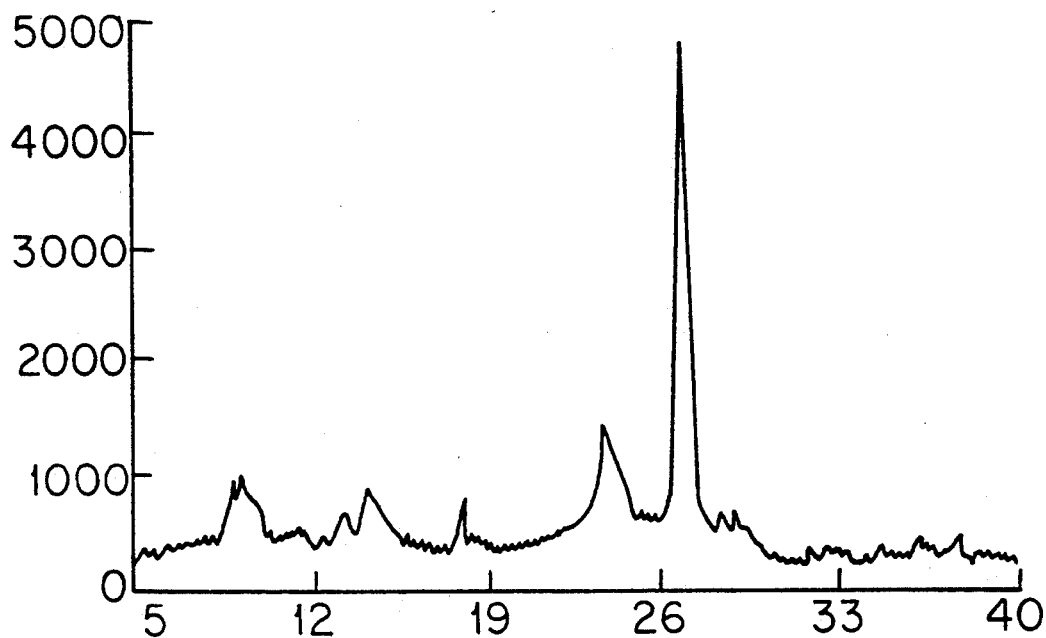
FIGS. 1 and 2 each shows an X-ray diffraction pattern (abscissa: Bragg angle ($2\theta$); ordinate: intensity (CPS)) of the titanyl phthalocyanine crystals obtained in Examples 1 and 2, respectively.

The titanyl phthalocyanine crystal which can be used as a photoconductive material in the present invention is a novel crystal characterized by at least five diffraction peaks of its X-ray diffraction pattern at Bragg angles ($2\theta \pm 0.2$) of 27.2°, 24.9°, 18.0°, 14.3°, and 9.5°.

Such a novel crystal can be prepared as follows.

In production of the novel crystal, titanyl phthalocyanine which is synthesized by a known method as described in U.S. Pat. Nos. 4,664,997 and 4,898,799 is used. For example, titanyl phthalocyamine is synthesized by reacting 1,3-diiminoisoindoline with titanium tetrabutoxide, or by reacting 1,2dicyanobenzene (o-diphthalonitrile) with a titanium compound as shown in the following scheme (1) or (2).

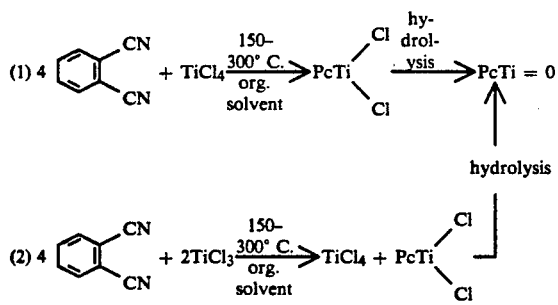

In the scheme, Pc represents a phthalocyanine residue. Namely, 1,2-dicyanobenzene and a titanium halide are heated in an inert solvent to react. Examples of the titanium halide include titanium tetrachloride, titanium trichloride, titanium tetrabromide and the like, and titanium tetrachloride is preferably used in view of production costs. As an inert solvent, organic solvents having a high boiling point are preferably used, such as trichlorobenzene, α-chloronaphthalene, β-chloronaphthalene, α-methylnaphthalene, methoxynaphthalene, diphenyl ether, diphenylmethane, diphenylethane, ethylene glycol dialkyl ethers, diethylene glycol dialkyl ethers, triethylene glycol dialkyl ethers and the like. The reaction is generally performed at 150° to 300° C. and preferably at 180° to 250° C. After the reaction, the produced dichlorotitanium phthalocyanine is separated by filtration and washed with a solvent as used in the reaction to remove by-products and unreacted starting materials. Then, the resulting product is washed with an inert solvent such as alcohols (e.g., methanol, ethanol, and isopropyl alcohol) and ethers (e.g., tetrahydrofuran and 1,4-dioxane) to remove the solvent which has been used in the reaction and in the subsequent washing step. The resultant is then subjected to hydrolysis with hot water to obtain titanyl phthalocyane.

Titanyl phthalocyanine synthetically prepared as described above is poured into concentrated sulfuric acid to form a solution or a slurry, and the solution or slurry is poured into water to precipitate amorphous or quasi-amorphous titanyl phthalocyanine. The precipitate is isolated and then treated with a mixed solvent of an aromatic solvent and water. Alternatively, the above-prepared concentrated sulfuric acid solution or slurry is poured into a mixed solvent of an alcohol solvent and water, or a mixed solvent of an aromatic solvent and water to precipitate a crystal.

Solvents which can be used for precipitation include alcohol solvents having up to 5 carbon atoms (e.g., methanol and ethanol); and aromatic solvents such as aromatic hydrocarbons (e.g., benzene, toluene, and xylene), aromatic nitro compounds (e.g., nitrobenzene), aromatic halogen compounds (e.g., monochlorobenzene, dichlorobenzene, trichlorobenzene, and chloronaphthalene); and phenol. In using a mixed solvent, the alcohol/water volume ratio is from 99/1 to 10/90, and preferably from 99/1 to 50/50, and the aromatic solvent/water volume ratio is from 1/99 to 50/50, and preferably from 3/97 to 60/40.

Electrophotographic photoreceptors according to the present invention in which the above-described titanyl phthalocyanine crystal is used as a photoconductive material in the photosensitive layer thereof are explained below by referring to the accompanying drawings.

Figure 13:
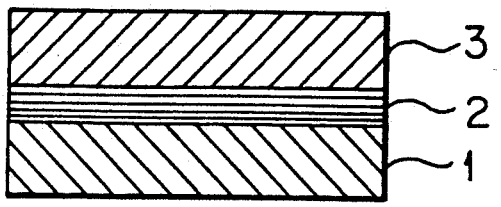
FIGS. 13 through 18 each shows a schematic cross section of the electrophotographic photoreceptors according to the present invention.
Figure 14:
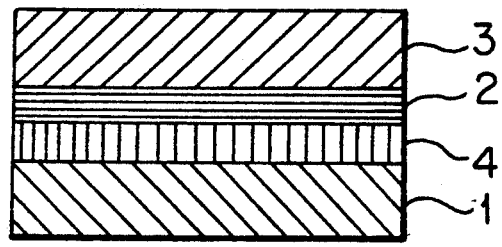
Figure 15:
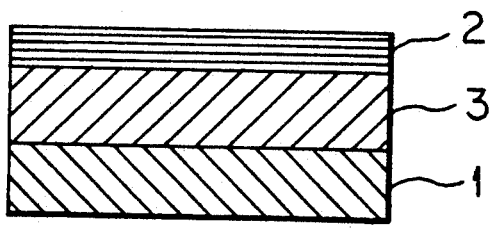
Figure 16:
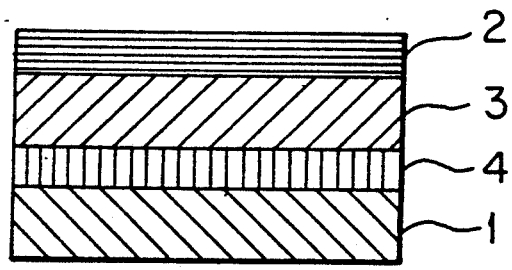
Figure 17:
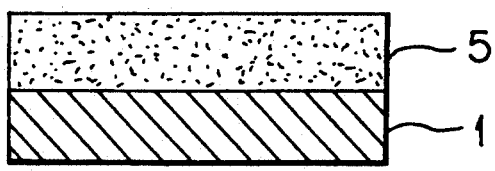
Figure 18:
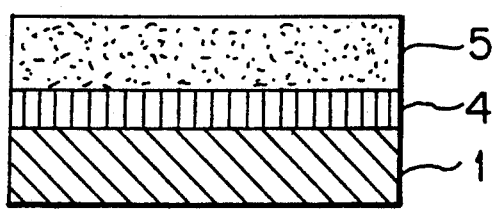

FIGS. 13 to 18 each schematically illustrates a layer structure of the electrophotographic photoreceptors according to the present invention. Laminate type photoreceptors are shown in FIGS. 13 to 16. In FIG. 13, conductive support 1 has thereon charge generating layer 2 and charge transporting layer 3 in this order. In FIG. 15, conductive support 1 has thereon charge transporting layer 3 and charge generating layer 2 in this order. In FIGS. 14 and 16, subbing layer 4 is provided on conductive support 1. Photoreceptors having a single photosensitive layer are shown in FIGS. 17 and 18, in which conductive support 1 has thereon photoconductive layer 5 with or without subbing layer 4 being provided between the support and the photoconductive layer.

The charge generating layer in the laminate structures as shown in FIGS. 13 to 16 comprises of the above-mentioned titanyl phthalocyanine crystal and a binder resin. Binder resins to be used can be chosen from a broad range of insulating resins or organic photoconductive polymers, e.g., poly-N-vinylcarbazole, polyvinylanthracene, and polyvinylpyrene. Suitable binder resins include insulating resins, such as polyvinyl butyral, polyarylate (e.g., a polycondensate of bisphenol A and phthalic acid), polycarbonates, polyesters, phenoxy resins, vinyl chloride-vinyl acetate copolymers, polyvinyl acetate, acrylic resins, polyacrylamide, polyamide, polyvinylpyridine, cellulose resins, urethane resins, epoxy resins, casein, polyvinyl alcohol, and polyvinyl pyrrolidone.

The charge generating layer can be formed by coating a conductive support with a coating composition prepared by dispersing the titanyl phthalocyanine crystal in a solution of a binder resin in an appropriate organic solvent, followed by drying. A suitable weight ratio of the titanyl phthalocyanine crystal to the binder resin is from 40/1 to 1/10, and preferably from 10/1 to ¼. If the ratio of the titanyl phthalocyanine crystal is too high, the coating composition has reduced stability. If it is too low, the resulting photoreceptor has reduced sensitivity.

Solvents to be used in the coating composition are preferably selected from those incapable of dissolving a lower layer. Examples of suitable solvents are alcohols (e.g., methanol, ethanol, and isopropanol); ketones (e.g., acetone, methyl ethyl ketone, and cyclohexanone); amides (e.g., N, N-dimethylformamide and N, N-dimethylacetamide); dimethyl sulfoxide; ethers (e.g., tetrahydrofuran, dioxane, and ethylene glycol monomethyl ether); esters (e.g., methyl acetate and ethyl acetage); aliphatic halogenated hydrocarbons (e.g., chloroform, methylene chloride, dichloroethylene, carbon tetrachloride, and trichloroethylene); and aromatic hydrocarbons (e.g., benzene, toluene, xylene, ligroin, monochlorobenzene, and dichlorobenzene).

Coating can be carried out by any of known techniques, such as dip coating, spray coating, spinner coating, bead coating, wire bar coating, blade coating, roller coating, and curtain coating. Drying is preferably conducted first at room temperature to once obtain a dry-to-touch state and then under heating at a temperature of from 30° to 200° C. for 5 minutes to 2 hours in still air or in an air flow.

The charge generating layer usually has a dry thickness of from about 0.05 to about 5 μm.

The charge transporting layer comprises a charge transporting material and a binder resin. Any of known charge transporting materials can be utilized, including polycyclic aromatic compound, (e.g., anthracene, pyrene, and phenanthrene); nitrogen-containing heterocyclic compounds (e.g., indole, carbazole, and imidazole); pyrazoline compounds, hydrazone compounds, triphenylmethane compounds, triphenylamine compounds, enamine compounds, and stilbene compounds. Specific examples of usable charge transporting materials are shown below.

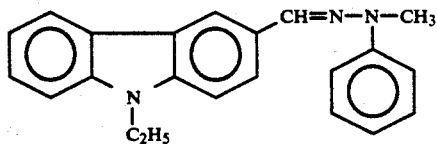
1.

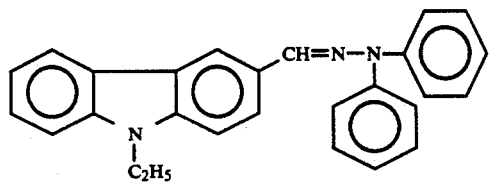
2.

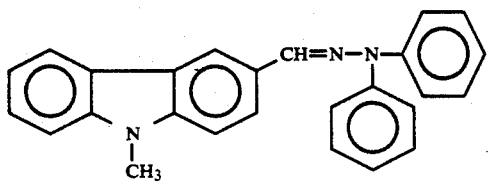
3.

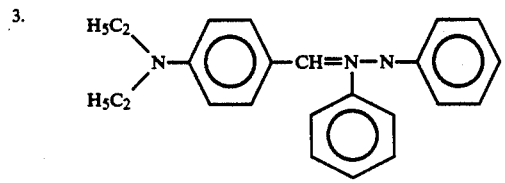
4.

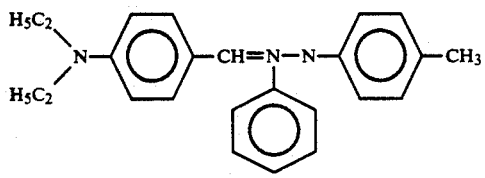
5.

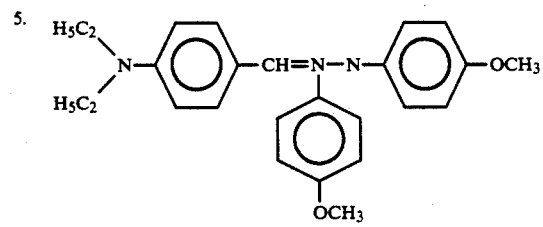
6.

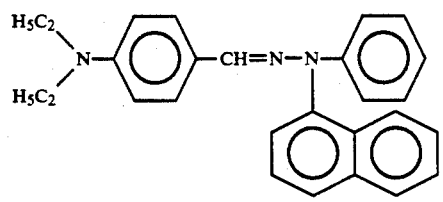
7.

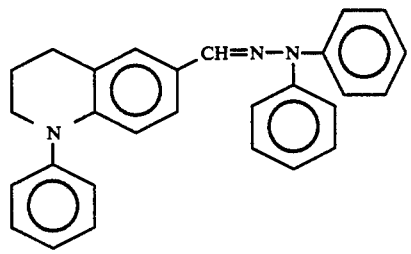
8.

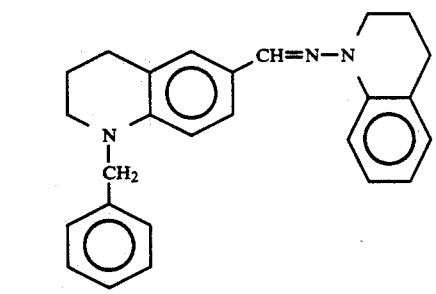
9.

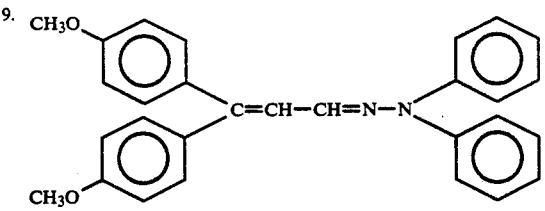
10.

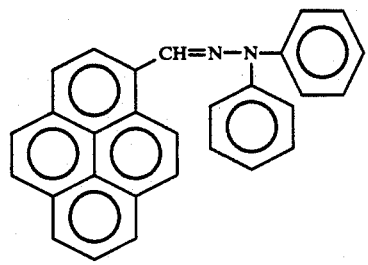
11.

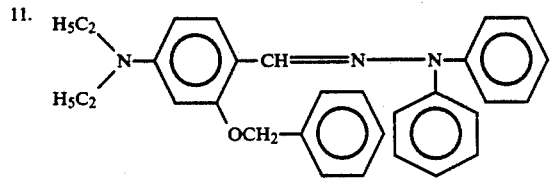
12.

-continued
13.
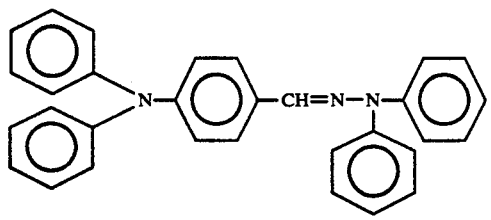
14.
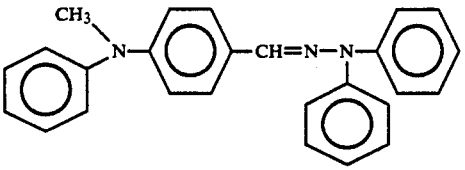
15.
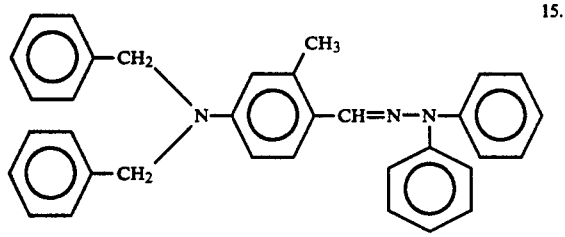
16.
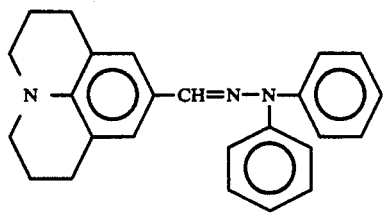
17.
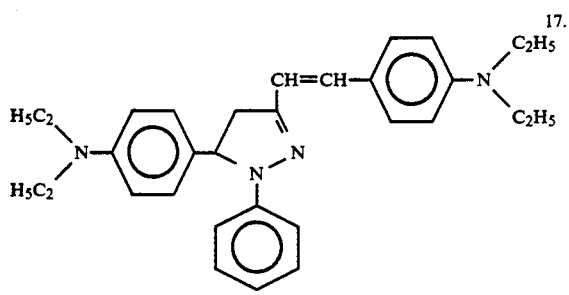
18.
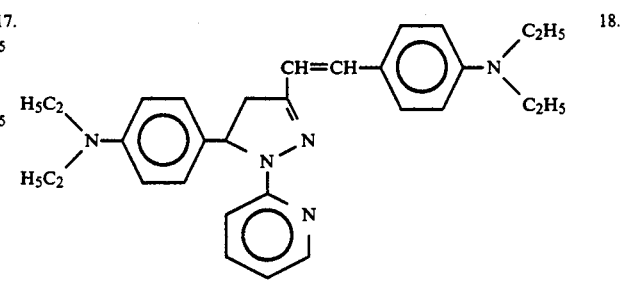
19.
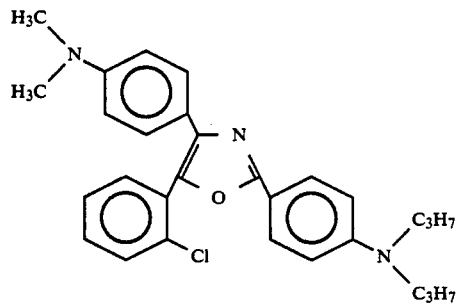
20.
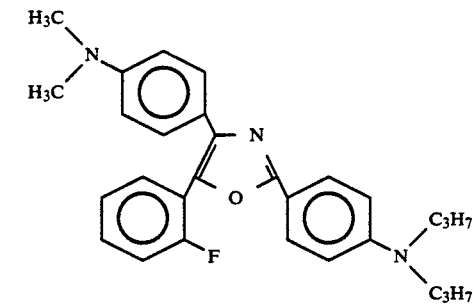
21.
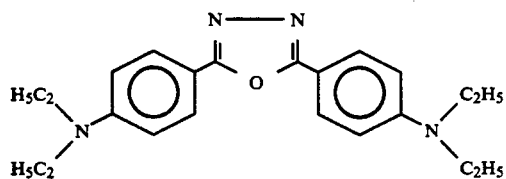
22.
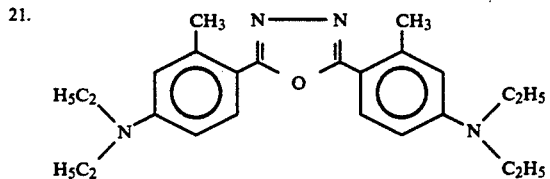
23.
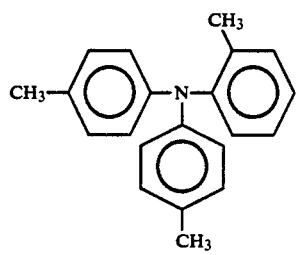
24.
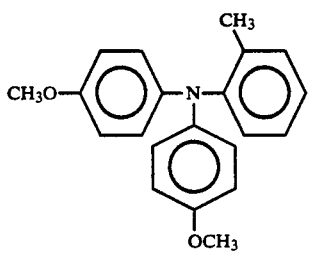

-continued
25.
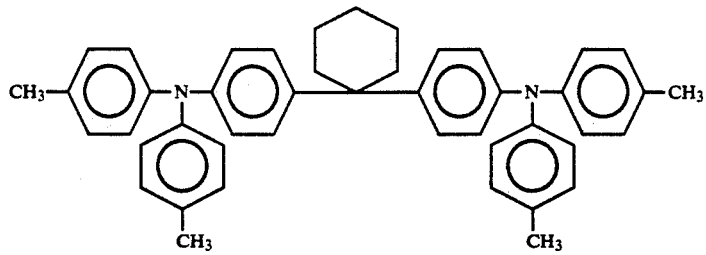
26.
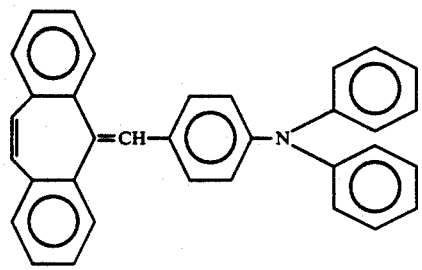
27.
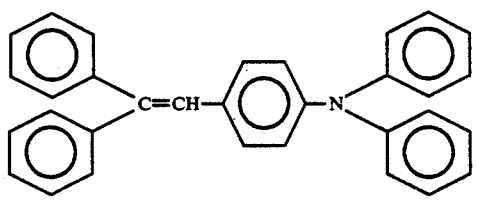
28.
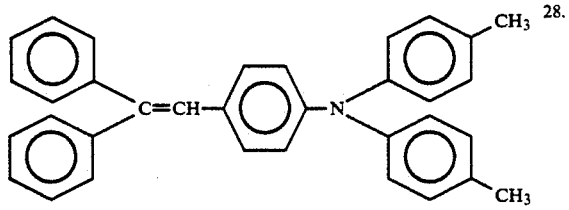
29.
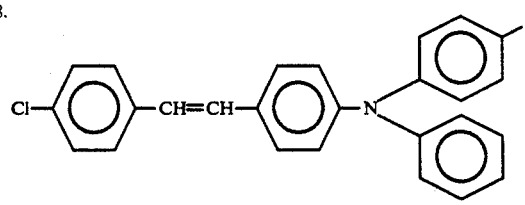
30.
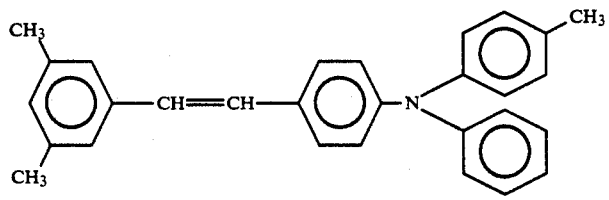
31.
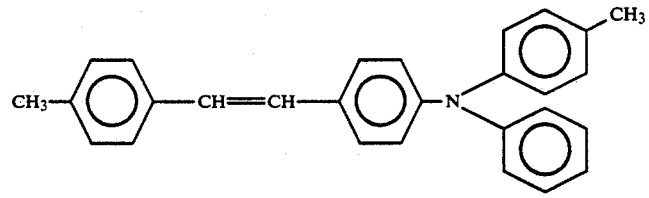
32.
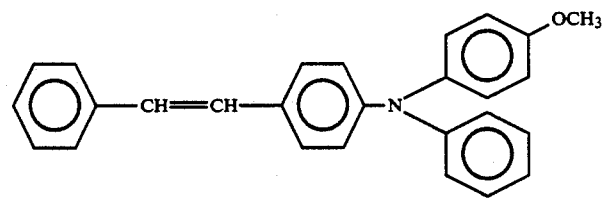
33.
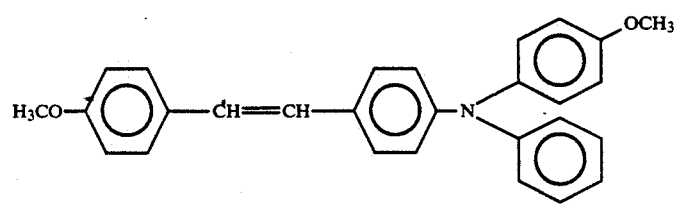

34. 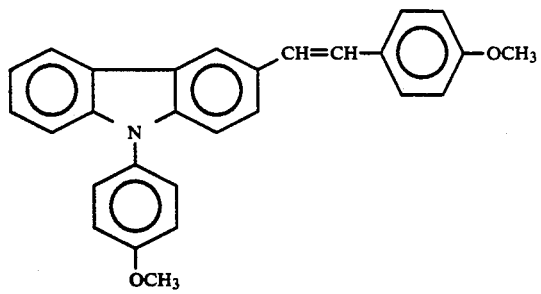
35. 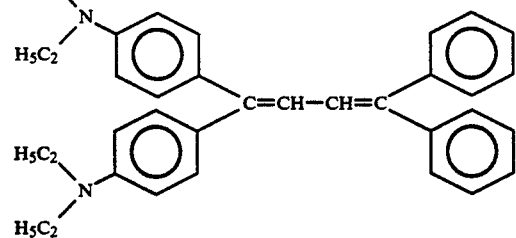
36. 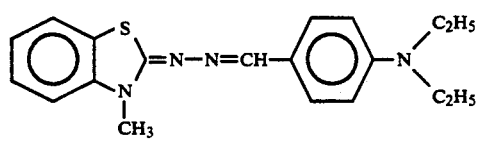
37. 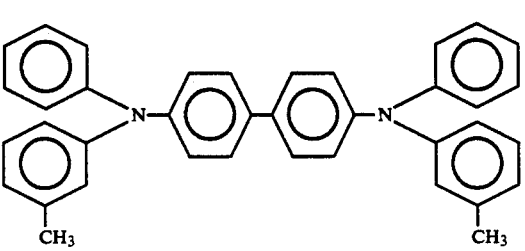
38. 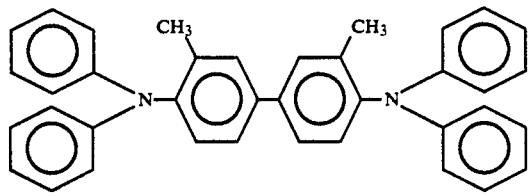
39. 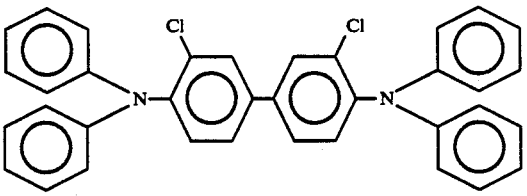
40. 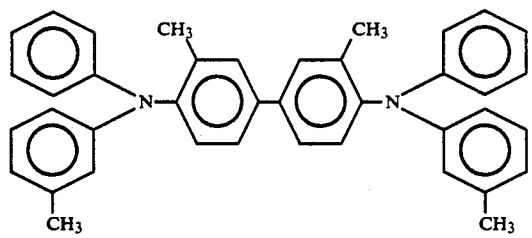
41. 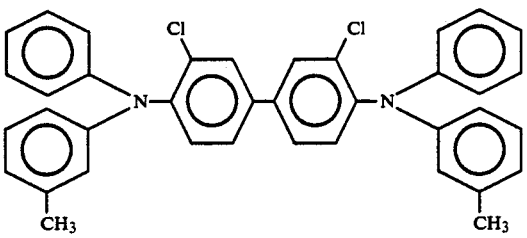
42. 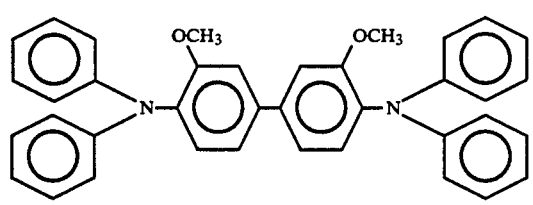
43. 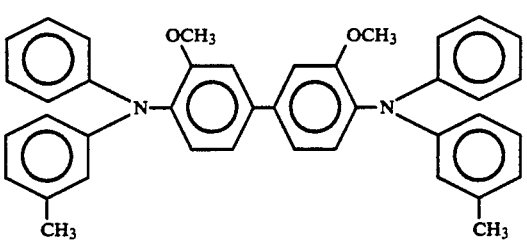
44. 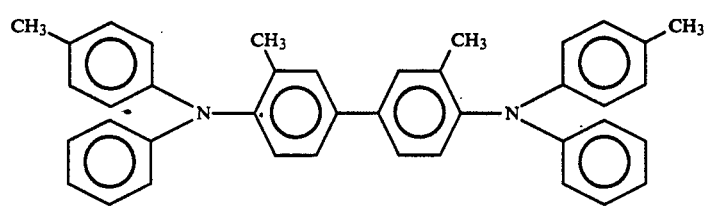

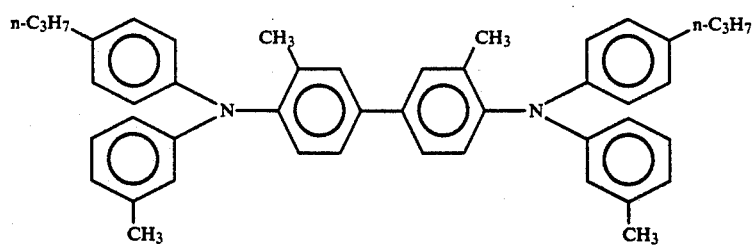
45.
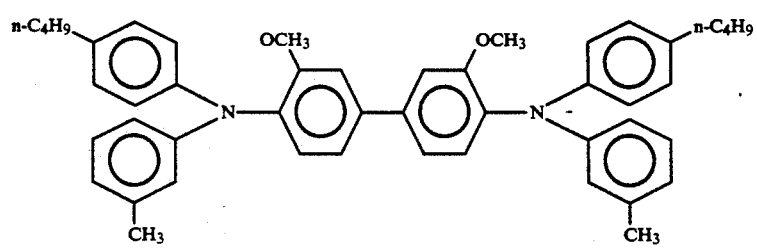
46.
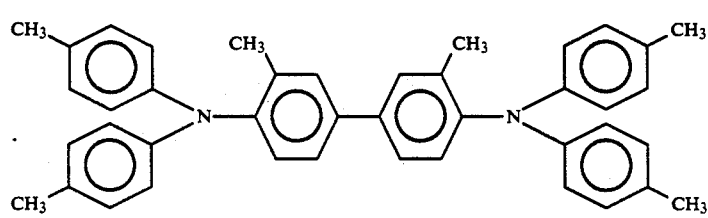
47.
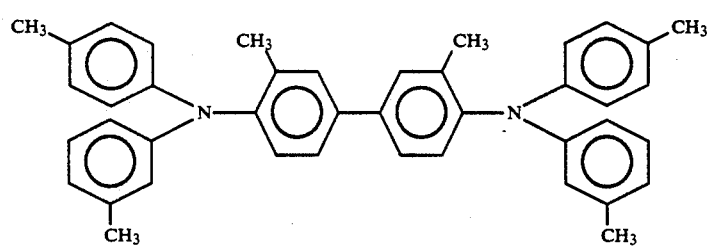
48.
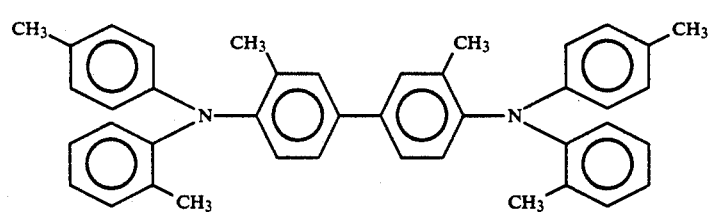
49.
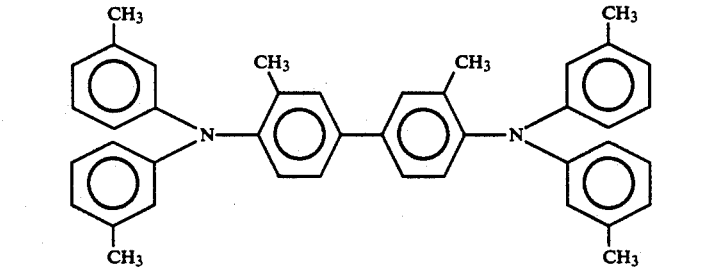
50.
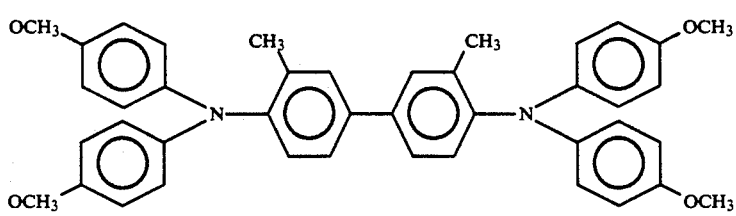
51.

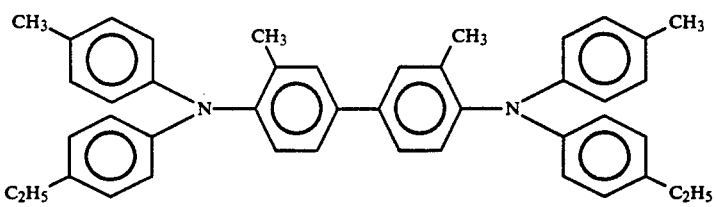
52.
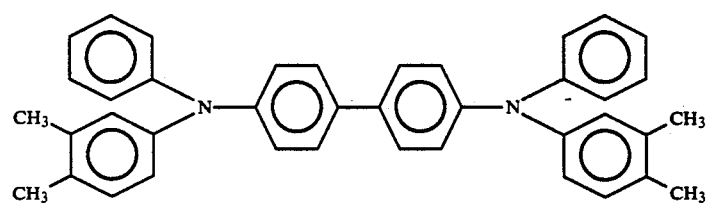
53.
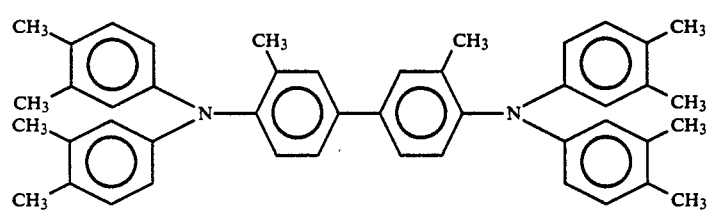
54.
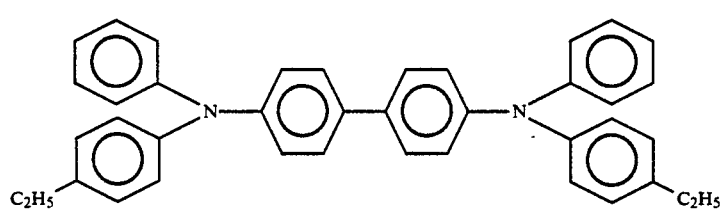
55.
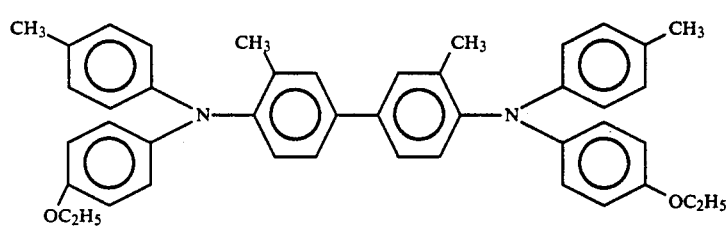
56.
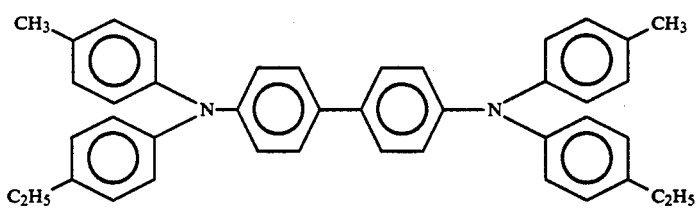
57.
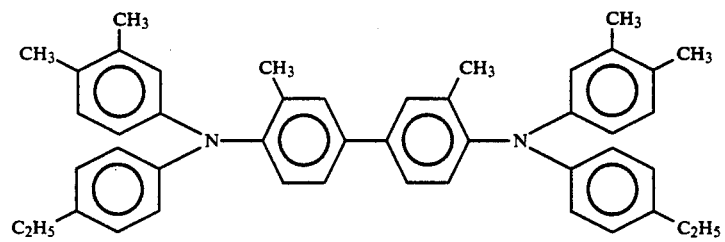
58.

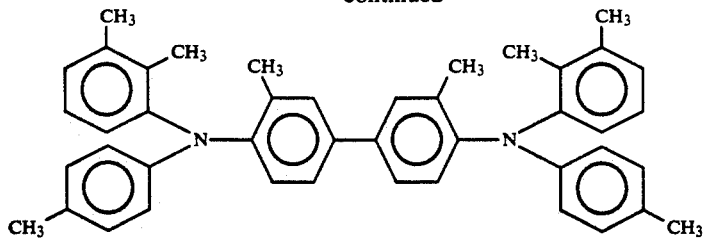

59.

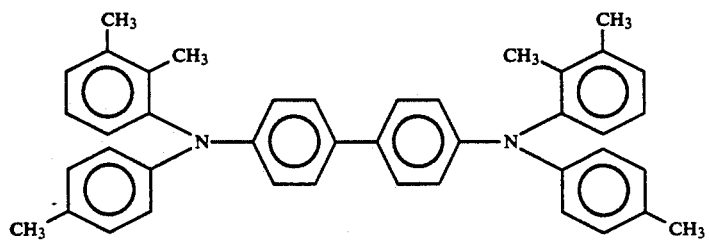

60.

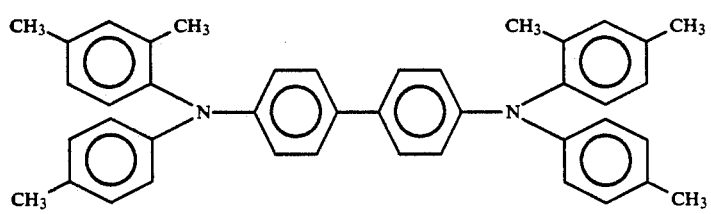

61.

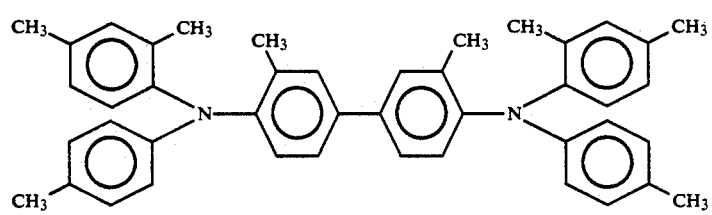

62.

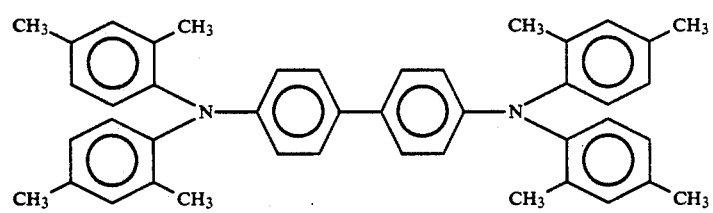

63.

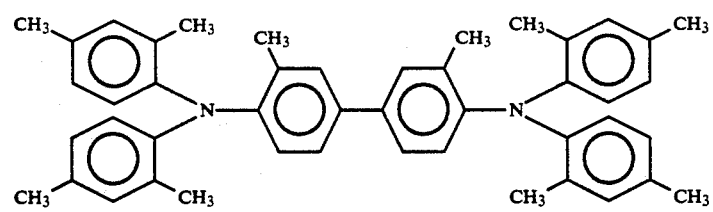

64.

Further, photoconductive polymers may also be used as charge transporting materials, such as poly-N-vinylcarbazole, halogenated poly-n-vinylcarbazole, polyvinyl anthracene, poly-N-vinylphenyl anthracene, polyvinylpyrene, polyvinylacridine, polyvinyl acenaphthylene, polyglycidyl carbazole, pyreneformaldehyde resins, and ethylcarbazole-formaldehyde resins. These polymers may form a charge transporting layer by themselves i.e., without a binder resin.

Binder resins which can be used in the charge transporting layer can be selected from those described above with reference to a charge generating layer.

The charge transporting layer can be formed by coating a conductive support or a charge generating layer with a coating composition comprising the above-described charge transporting material, a binder resin, and an organic solvent incapable of dissolving a lower layer in the same manner as for the charge generating layer. A suitable weight ratio of the charge transporting material to the binder resin is from 5/1 to 1/5.

The charge transporting layer usually has a dry thickness of from about 5 to about 50 μm.

In photoreceptors having a single layer structure as shown in FIGS. 17 and 18, the photosensitive layer is comprised of a photoconductive layer in which the above-described titanyl phthalocyanine crystal is dispersed in a binder resin together with a charge transporting material. It is preferred that the weight ratio of the charge transporting material to the binder resin ranges from about 1/20 to about 5/1, and the weight ratio of the titanyl phthalocyanine crystal to the charge transporting material ranges from about 1/10 to about 10/1. The charge transporting material and binder resin which can be used are selected from those enumerated above.

Any conductive support known useful in electrophotographic photoreceptors can be used in the present invention.

As illustrated in FIGS. 14, 16, and 18, a subbing layer may be provided on the conductive support. A subbing layer is effective for blocking unnecessary charge which may be injected from the conductive support thereby to improve charging properties of a photosensitive layer. It also serves to improve adhesion between a conductive support and a photosensitive layer.

Materials for constituting the subbing layer include polyvinyl alcohol, polyvinyl pyrrolidone, polyvinylpyridine, cellulose ethers, cellulose esters, polyamide, polyurethane, casein, gelatin, polyglutamic acid, starch, starch acetate, amino starch, polyacrylic acid, polyacrylamide, zirconium chelate compounds, zirconium alkoxide compounds, organozirconium compounds, titanyl chelate compounds, titanyl alkoxide compounds, organotitanyl compounds, and silane coupling agents. The subbing layer usually has a thickness of from about 0.05 to about 2 μm.

The present invention is now illustrated in greater detail with reference to Examples, but it should be understood that the present invention is not deemed to be limited thereto. All the parts, percents and ratios are by weight unless otherwise indicated.

SYNTHESIS EXAMPLE

Synthesis o Titanyl Phthalocyanine

To 20 parts of 1- chloronaphthalene were added 3 parts of 1,3- diiminoisoindoline and 1.7 parts of titanium tetrabutoxide, and the mixture was allowed to react at 190° C. for 5 hours. The reaction product was collected by filtration and washed successively with aqueous ammonia, water, and acetone to obtain 4.0 parts of a titanyl phthalocyanine crystal.

Figure 3:
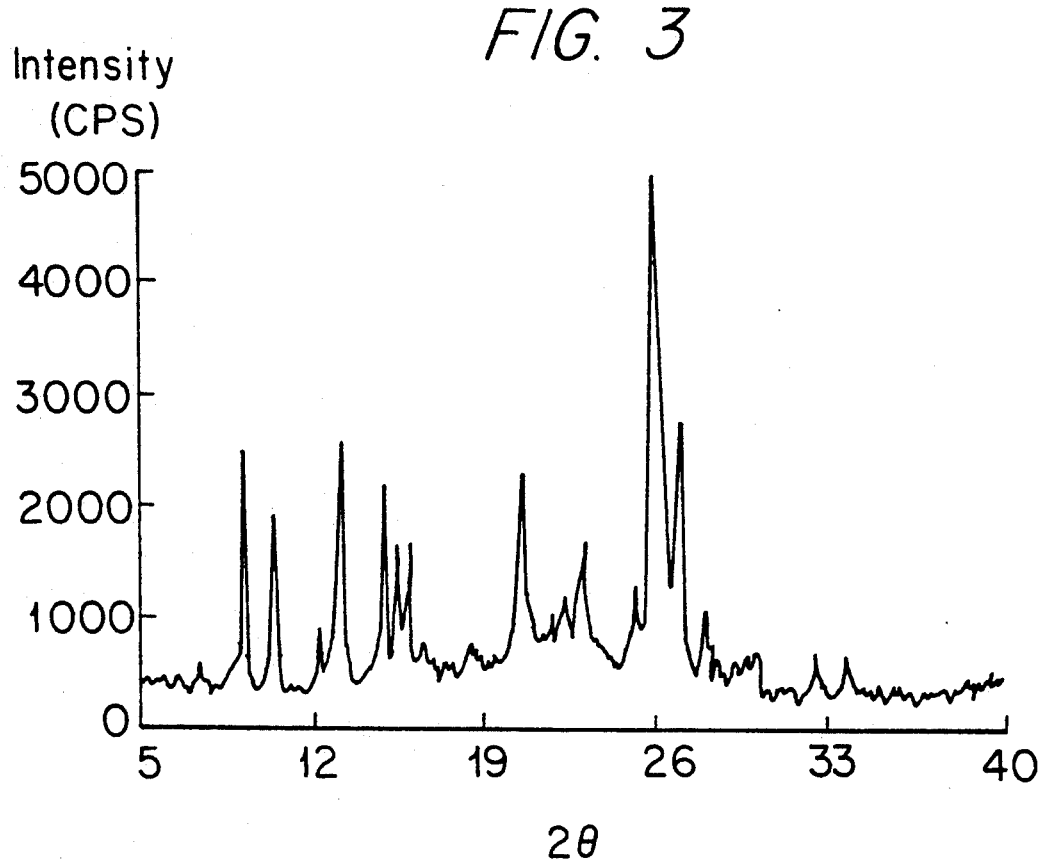
FIGS. 3 and 4 each shows an X-ray diffraction pattern of the titanyl phthalocyanine crystals used in Comparative Examples 1 and 2, respectively.

A powder X-ray diffraction pattern of the resulting titanyl phthalocyanine crystal is shown in FIG. 3.

EXAMPLE 1

Figure 4:
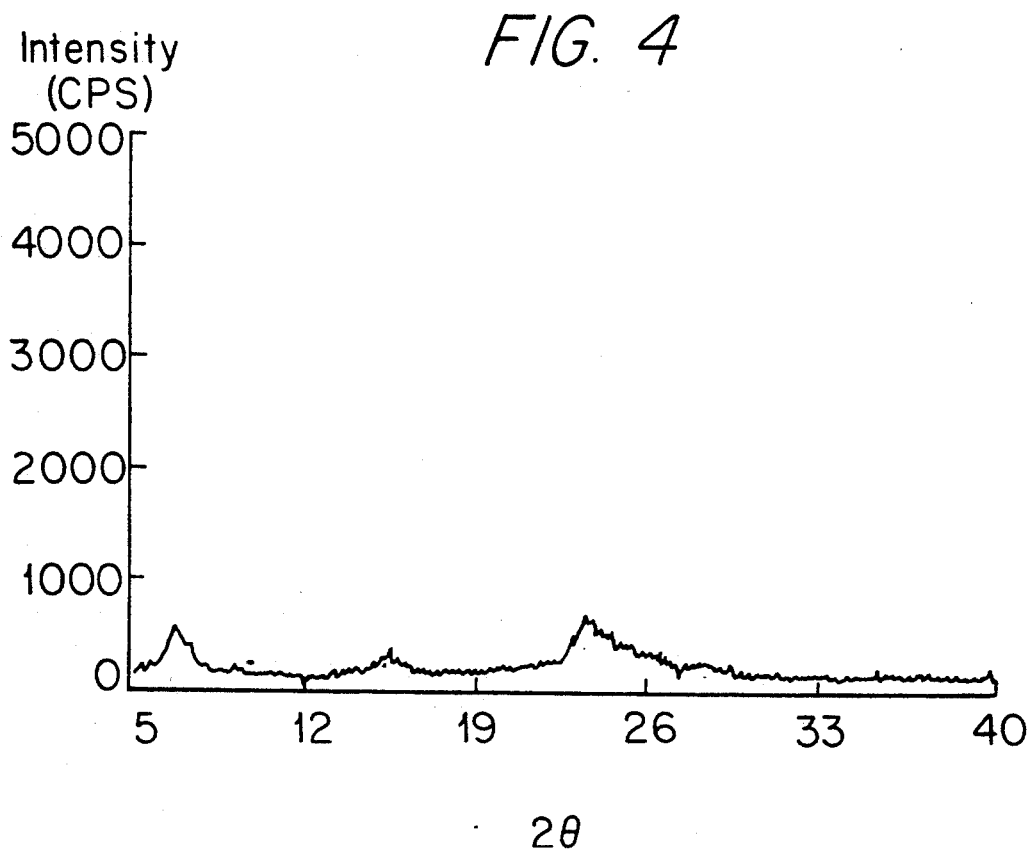

Two parts of the titanyl phthalocyanine crystal obtained in Synthesis Example were dissolved in 100 parts of 97% sulfuric acid at 5° C., and the solution was poured into 1300 parts of ice-water. The precipitated crystal was collected by filtration, washed successively with dilute aqueous ammonia and water, and dried to obtain 1.6 parts of a titanyl phthalocyanine powder. A powder X-ray diffraction pattern of the resulting titanyl phthalocyanine powder is shown in FIG. 4.

One part of the resulting titanyl phthalocyanine powder was stirred in a mixed solvent consisting of 10 parts of water and 1 part of monochlorobenzene at 50° C. for 1 hour, followed by filtration. The solid was washed successively with methanol and water to obtain 0.9 part of a titanyl phthalocyanine crystal. A powder X-ray diffraction pattern of the resulting crystal is shown in FIG. 1.

EXAMPLE 2

Figure 2:
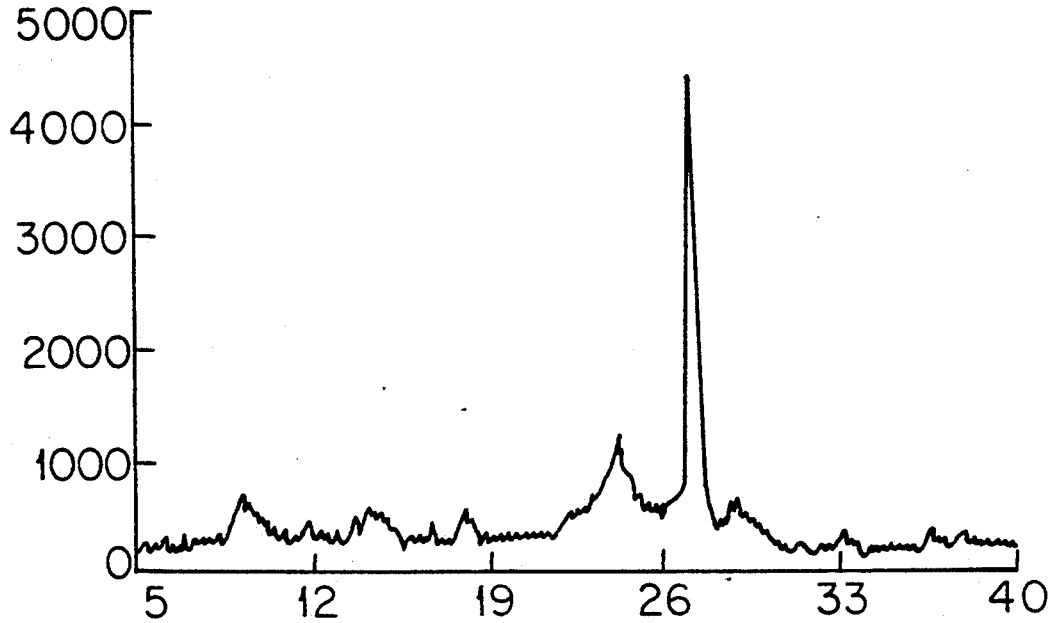

Two parts of the titanyl phthalocyanine crystal obtained in Synthesis Example were dissolved in 100 parts of 97% sulfuric acid at 5° C., and the solution was poured into an ice-cooled mixed solvent consisting of 400 parts of methanol and 400 parts of water. The precipitated crystal was filtered, washed successively with methanol, dilute aqueous ammonia, and water and dried to obtain 1.6 parts of a titanyl phthalocyanine crystal. A powder X-ray diffraction pattern of the resulting titanyl phthalocyanine crystal is shown in FIG. 2.

EXAMPLE 3

One part of the titanyl phthalocyanine crystal obtained in Example 1 was mixed with 1 part of polyvinyl butyral ("ESLEC BM-1", produced by Sekisui Chemical Co., Ltd.) and 100 parts of cyclohexanone, and the mixture was dispersed in a paint shaker together with glass beads for 1 hour. The resulting coating composition was coated on an aluminum support by dip coating and dried by heating at 100° C. for 5 minutes to form a 0.2 μm-thick charge generating layer.

In 20 parts of monochlorobenzene were dissolved 2 parts of Compound (37) described above and 3 parts of poly(4,4-cyclohexylidenediphenylenecarbonate) of formula:

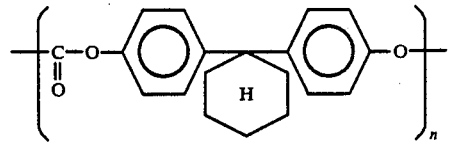

and the resulting coating composition was coated on the charge generating layer by dip coating and dried by heating at 120° C. for 1 hour to form a 20 μm-thick charge transporting layer.

The resulting electrophotographic photoreceptor was charged to −6 kV with a corona discharge in an ambient-temperature and ambient-humidity condition (20° C., 50% RH) by means of an electrostatic copying paper analyzer ("EPA-8100" manufactured by Kawaguchi Denki K. K.) and then exposed to monochromatic light (800 nm) isolated from light emitted from a tungsten lamp by a monochromator at an irradiance of 1 μW/cm$^2$. The exposure amount $E_{\frac{1}{2}}$ (erg/cm$^2$) necessary for the surface potential to be reduced to ½ the initial surface potential $V_O$(V) was measured. Then, the photoreceptor was irradiated with tungsten light of 10 lux for 1 second, and a residual potential $V_R$ was measured. Further, the above-described charging and exposure were repeated 1000 times, and the same measurements of $V_O$, $E_{\frac{1}{2}}$, and $V_R$ were made. The results obtained are shown in Table 1 below.

EXAMPLE 4

An aluminum-plated support was coated with a coating composition comprising 10 parts of an organozirconium compound ("ORGATICS ZC 540" produced by Matsumoto Seiyaku K. K.), 2 parts of a silane coupling agent ("A1110" produced by NIPPON UNICAR K. K.), 30 parts of isopropyl alcohol, and 30 parts of n-butanol by dip coating and dried at 150° C. for 5 minutes to form a 0.1 μm-thick subbing layer.

A charge generating layer and a charge transporting layer were formed thereon in the same manner as in Example 3. The resulting photoreceptor was evaluated in the same manner as in Example 3, and the results obtained are shown in Table 1.

EXAMPLE 5

A coating composition comprising 5 parts of polyamide ("CM 8000" produced by Toray Industries, Inc.), 4 parts of methanol, and 1 part of n-butanol was coated on an aluminum support by dip coating and dried at 150° C. for 5 minutes to form a 0.3 μm-thick subbing layer.

A charge generating layer and a charge transporting layer were formed thereon in the same manner as in Example 3. The resulting photoreceptor was evaluated in the same manner as in Example 3, and the results obtained are shown in Table 1.

EXAMPLE 6

A coating composition comprising 1 part of polyvinyl alcohol partial acetoacetal, 1 part of water, and 8 parts of propanol was coated on an aluminum support by dip coating and dried at 150° C. for 5 minutes to form a 0.2 μm-thick subbing layer.

A charge generating layer and a charge transporting layer were formed thereon in the same manner as in Example 3. The resulting photoreceptor was evaluated in the same manner as in Example 3, and the results obtained are shown in Table 1.

EXAMPLE 7

A coating composition comprising 5 parts of nylon 8 ("LUCKAMIDE 5003" produced by Dai-Nippon Ink & Chemicals, Inc.), 3 parts of methanol, and 2 parts of n-butanol was coated on an aluminum support by dip coating and dried at 150° C. for 5 minutes to form a 0.2 μm thick subbing layer.

A charge generating layer and a charge transporting layer were formed thereon in the same manner as in Example 3. The resulting photoreceptor was evaluated in the same manner as in Example 3, and the results obtained are shown in Table 1.

EXAMPLE 8

An electrophotographic photoreceptor was prepared in the same manner as in Example 3, except for using the titanyl phthalocyanine crystal obtained in Example 2 as a charge generating material. The resulting photoreceptor was evaluated in the same manner as in Example 3, and the results obtained are shown in Table 1.

EXAMPLE 9

An electrophotographic photoreceptor was prepared in the same manner as in Example 3, except for replacing Compound (37) with Compound (35). The resulting photoreceptor was evaluated in the same manner as in Example 3, and the results obtained are shown in Table 1.

EXAMPLE 10

An electrophotographic photoreceptor was prepared in the same manner as in Example 3, except for replacing Compound (37) with Compound (15). The resulting photoreceptor was evaluated in the same manner as in Example 3, and the results obtained are shown in Table 1.

EXAMPLE 11

An electrophotographic photoreceptor was prepared in the same manner as in Example 3, except for replacing Compound (37) with Compound (11). The resulting photoreceptor was evaluated are shown in Table 1.

EXAMPLE 12

An electrophotographic photoreceptor was prepared in the same manner as in Example 3, except for replacing Compound (37) with Compound (26). The resulting photoreceptor was evaluated in the same manner as in Example 3, and the results obtained are shown in Table 1.

EXAMPLE 13

An electrophotographic photoreceptor was prepared in the same manner as in Example 3, except for replacing Compound (37) with Compound (28). The resulting photoreceptor was evaluated in the same manner as in Example 3, and the results obtained are shown in Table 1.

EXAMPLE 14

An electrophotographic photoreceptor was prepared in the same manner as in Example 3, except for replacing Compound (37) with Compound (33). The resulting photoreceptor was evaluated in the same manner as in Example 3, and the results obtained are shown in Table 1.

EXAMPLE 15

An electrophotographic photoreceptor was prepared in the same manner as in Example 3, except for replacing Compound (37) with Compound (52). The resulting photoreceptor was evaluated in the same manner as in Example 3, and the results obtained are shown in Table 1.

EXAMPLE 16

An electrophotographic photoreceptor was prepared in the same manner as in Example 3, except for replacing Compound (37) with Compound (55). The resulting photoreceptor was evaluated in the same manner as in Example 3, and the results obtained are shown in Table 1.

COMPARATIVE EXAMPLE 1

An electrophotographic photoreceptor was prepared in the same manner as in Example 3, except for using titanyl phthalocyanine having the powder X-ray diffraction pattern of FIG. 3 as a charge generating material. The resulting photoreceptor was evaluated in the same manner as in Example 3, and the results obtained are shown in Table 1.

COMPARATIVE EXAMPLE 2

An electrophotographic photoreceptor was prepared in the same manner as in Example 3, except for using titanyl phthalocyanine having the powder X-ray diffraction pattern of FIG. 4, which was obtained as an intermediate product in Example 1, as a charge generating material. The resulting photoreceptor was evaluated in the same manner as in Example 3, and the results obtained are shown in Table 1.

COMPARATIVE EXAMPLE 3

Synthesis of α-Titanyl Phthalocyanine

Figure 5:
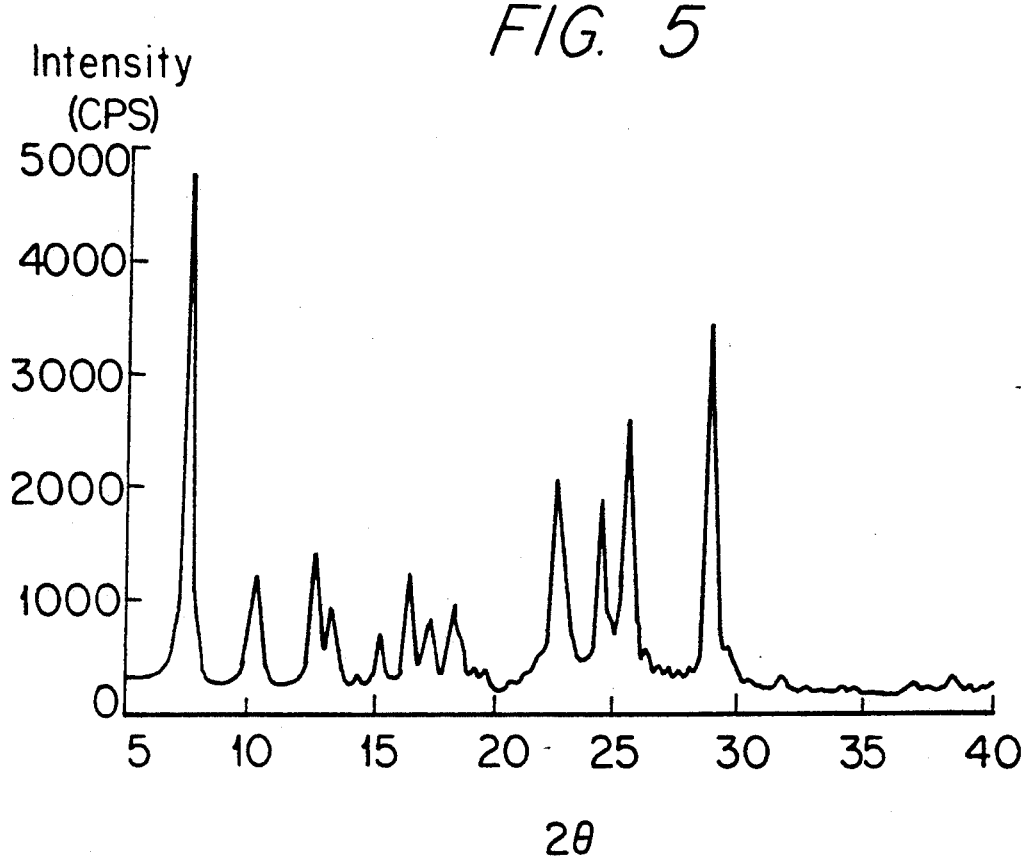
FIGS. 5 through 8 each shows an X-ray diffraction pattern of the titanyl phthalocyanine crystals obtained in Comparative Examples 3 through 6, respectively.

A mixture consisting of 4 parts of phthalodinitrile, 1.8 parts of titanium tetrachloride, and 60 parts of α-chloronaphthalene was stirred at 240° to 250° C. for 3 hours in a nitrogen stream to complete the reaction. The reaction mixture was filtered to collect dichlorotitanium phthalocyanine. The resulting dichlorotitanium phthalocyanine was mixed with 30 parts of concentrated aqueous ammonia, and the mixture was heated under reflux for 1 hour. The reaction product was thoroughly washed in a Soxhlet's extractor. The product was identified to be α-titanyl phthalocyanine whose X-ray diffraction pattern is shown in FIG. 5.

Preparation of Photoreceptor

An electrophotographic photoreceptor was prepared in the same manner as in Example 3, except for using the thus prepared α-titanyl phthalocyanine as a charge generating material. The resulting photoreceptor was evaluated in the same manner as in Example 3, and the results obtained are shown in Table 1. The photoreceptor suffered from considerable desensitization under a low humidity condition.

COMPARATIVE EXAMPLE 4

Preparation of Titanyl Phthalocyanine A as described in JP-A-2-8256

Three parts of phthalodinitrile was added to 28 parts of α-chloronaphthalene, and 1.2 parts of titanium tetrachloride was added thereto dropwise in a nitrogen atmosphere. After the dropwise addition, the temperature was elevated, and the mixture was allowed to react at 200° to 220° C. for 3 hours with stirring. After allowing to cool, the reaction mixture was filtered while hot at 100° to 130° C. and washed with 7 parts of α-chloronaphthalene heated to 100° C. The resulting crude cake was washed successively with 11 parts of α-chloronaphthalene and 7 parts of methanol at room temperature and then repeatedly washed each with 20 parts of hot methanol for 1 hour. The resulting cake was suspended in 20 parts of water and washed while hot for 2 hours, followed by filtration. The filtrate had a pH of less than 1. Washing with hot water was repeated until the filtrate had a pH of 6.

Figure 6:
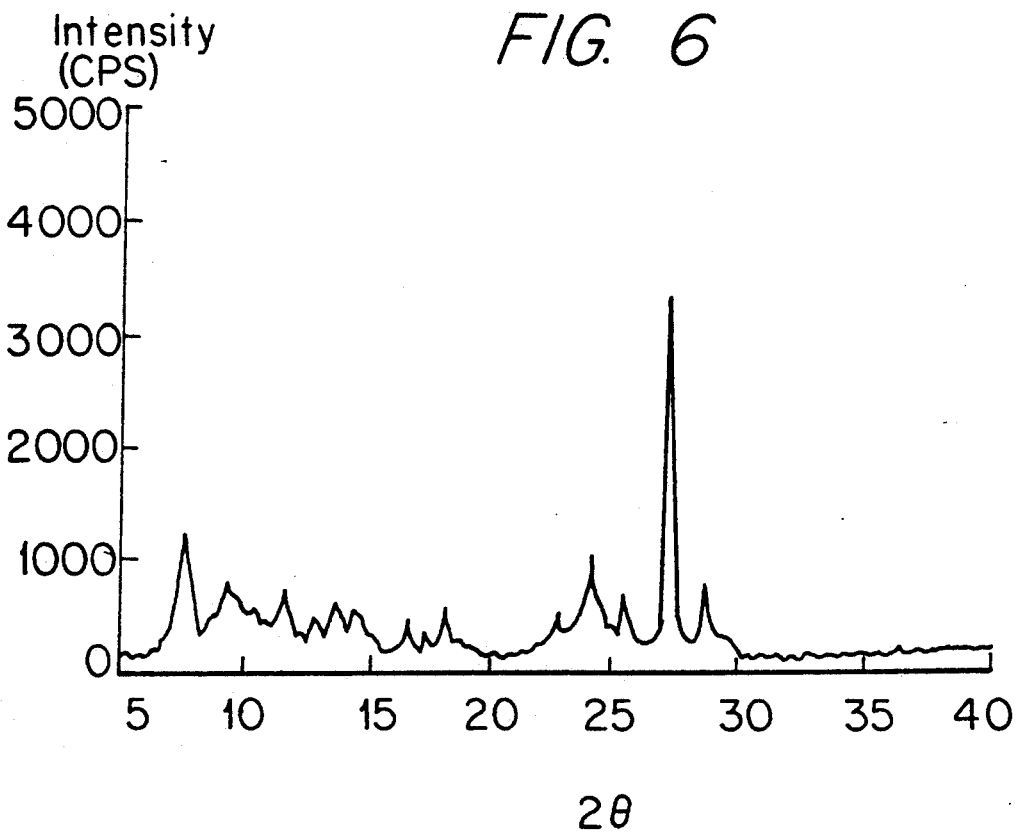

An X-ray diffraction spectrum of the resulting titanyl phthalocyanine A is shown in FIG. 6. The spectrum revealed diffraction peaks at Bragg angles (2θ) of 28.6°, 25.3°, 22.5°, and 7.5°, implying that the crystal is a mixed crystal with the α-form shown in Comparative Example 3. The product was also found liable to change its crystal form in n-butyl acetate.

Preparation of Photoreceptor:

An electrophotographic photoreceptor was prepared in the same manner as in Example 3, except for using the thus prepared titanyl phthalocyanine A as a charge generating material. The resulting photoreceptor was evaluated in the same manner as in Example 3, and the results obtained are shown in Table 1.

The photoreceptor had low sensitivity and poor stability against an environmental change.

COMPARATIVE EXAMPLE 5

Figure 7:
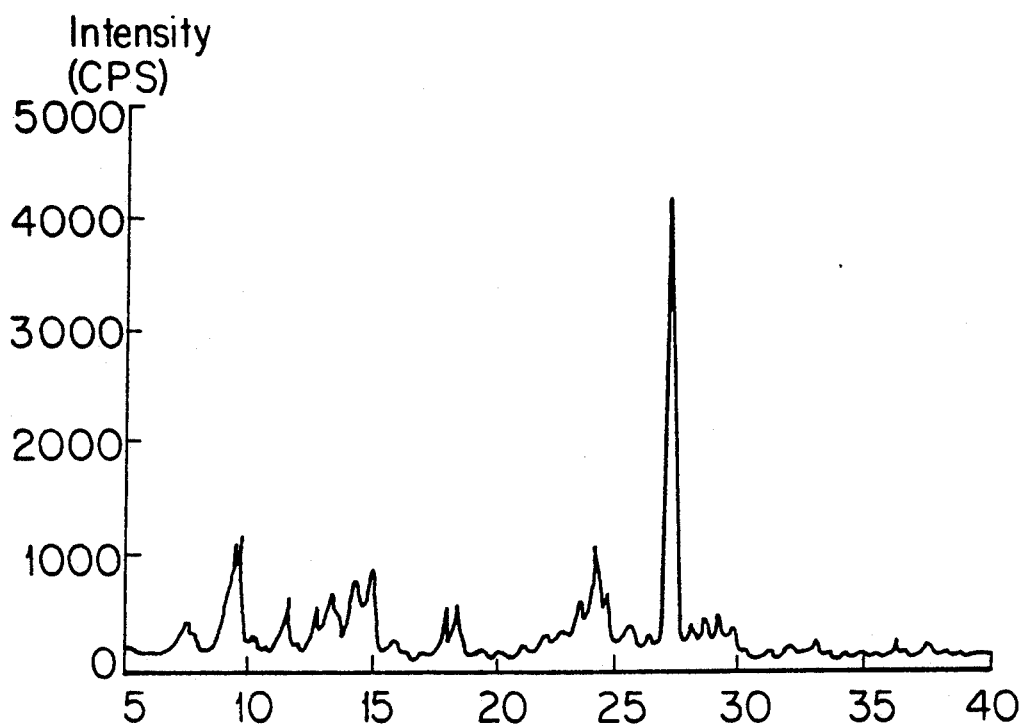

Preparation of Titanyl Phthalocyanine B as described in JP-A-64-17066 o-Phthalodinitrile (5.1 parts) and 1.9 parts of titanium tetrachloride were reacted in 12.5 parts of quinoline at 200° C. steam distillation, and the residue was purified with a 2% hydrochloric acid aqueous solution and then with a 2% sodium hydroxide aqueous solution, washed successively with methanol and N,N-dimethylformamide, and dried to obtain 5.3 parts of titanyl phthalocyanine. The resulting titanyl phthalocyanine was dissolved in 100 parts of 98% sulfuric acid at 5° C. in small portions, followed by stirring for about 1 hour while maintaining at 5° C. or lower. The sulfuric acid solution was then slowly poured into a mixture of 700 parts of distilled water and 70 parts of monochlorobenzene kept at 5° C. or lower while stirring at a high speed thereby to precipitate a crystal. The temperature was elevated up to 50° C., and the mixture was stirred at that temperature for about 1 hour. The precipitated crystal was collected by filtration and washed successively with ethanol, 2% aqueous ammonia, and distilled water and dried to obtain titanyl phthalocyanine B. An X-ray diffraction pattern of the resulting titanyl phthalocyanine is shown in FIG. 7. The crystal exhibited a diffraction peak at 7.5°.

Preparation of Photoreceptor

An electrophotographic photoreceptor was prepared in the same manner as in Example 3, except for using the thus prepared titanyl phthalocyanine B as a charge generating material. The resulting photoreceptor was evaluated in the same manner as in Example 3, and the results obtained are shown in Table 1.

The photoreceptor had low sensitivity and poor stability against an environmental change.

COMPARATIVE EXAMPLE 6

Figure 8:
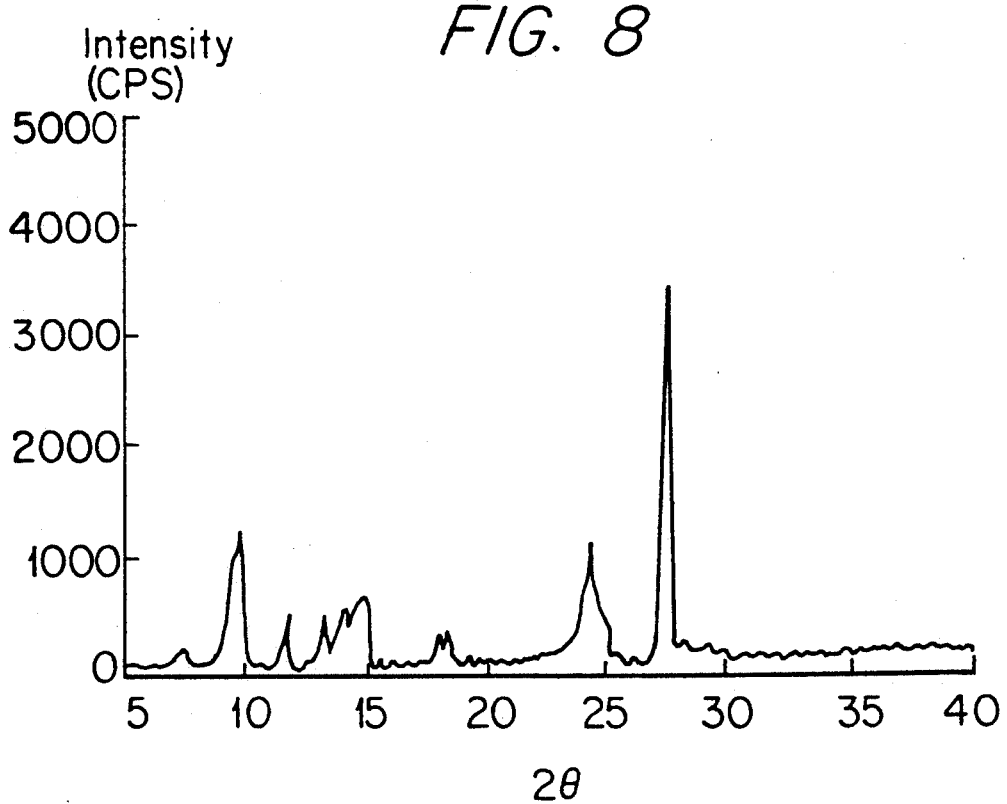

Synthesis of Titanyl Phthalocyanine C as described in JP-A-2-28265 o-Phthalodinitrile (20.4 parts) and 7.6 parts of titanium tetrachloride were reacted in 50 parts of quinoline at 200° C. for 2 hours. The reaction mixture was freed of the solvent by steam distillation, and the residue was purified with a 2% hydrochloric acid aqueous solution and then with a 2% sodium hydroxide aqueous solution, washed successively with methanol and N,N-dimethylformamide, and dried to obtain 21.3 parts of titanyl phthalocyanine. Two parts of the resulting titanyl phthalocyanine was dissolved in 40 parts of 98% sulfuric acid at 5° C. in small portions, followed by stirring for about 1 hour while maintaining at 5° C or lower. The sulfuric acid solution was then slowly poured into 400 parts of ice-water while stirring at a high speed, and the precipitated crystal was collected by filtration. The crystal was washed with distilled water until the washing became neutral. The residual wet cake which was assumed to contain 2 parts of phthalocyanine was stirred in 100 parts of tetrahydrofuran for about 5 hours, followed by filtration. The filter cake was washed with tetrahydrofuran and dried to obtain titanyl phthalocyanine C. An X-ray diffraction pattern of the resulting titanyl phthalocyanine C is shown in FIG. 8. The crystal was liable to change its crystal form in butyl n-acetate.

Preparation of Photoreceptor

An electrophotographic photoreceptor was prepared in the same manner as in Example 3, except for using the thus prepared titanyl phthalocyanine C as a charge generating material. The resulting photoreceptor was evaluated in the same manner as in Example 3, and the results obtained are shown in Table 1.

The photoreceptor had low sensitivity and poor stability against an environmental change.

TABLE 1

| Example No. | 1st Operation | | | 1000th Operation | | |
|---|---|---|---|---|---|---|
| | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| Example 3 | −820 | 1.3 | 0 | −810 | 1.3 | 0 |
| Example 4 | −865 | 1.4 | 0 | −860 | 1.5 | 0 |
| Example 5 | −840 | 1.3 | 0 | −830 | 1.6 | 0 |
| Example 6 | −860 | 1.4 | 0 | −855 | 1.4 | 0 |
| Example 7 | −840 | 1.4 | 0 | −840 | 1.4 | 0 |
| Example 8 | −840 | 1.3 | 0 | −830 | 1.3 | 0 |
| Example 9 | −810 | 1.4 | 0 | −790 | 1.4 | 0 |
| Example 10 | −820 | 1.4 | 5 | −800 | 1.4 | 5 |
| Example 11 | −810 | 1.3 | 0 | −800 | 1.3 | 0 |
| Example 12 | −840 | 1.4 | 0 | −830 | 1.4 | 5 |
| Example 13 | −825 | 1.4 | 0 | −815 | 1.4 | 0 |
| Example 14 | −810 | 1.4 | 0 | −790 | 1.4 | 0 |
| Example 15 | −860 | 1.3 | 0 | −860 | 1.3 | 0 |
| Example 16 | −840 | 1.3 | 0 | −830 | 1.3 | 0 |
| Comparative Example 1 | −780 | 4.1 | 10 | −750 | 3.8 | 15 |
| Comparative Example 2 | −760 | 3.7 | 10 | −720 | 3.5 | 20 |
| Comparative Example 3 | −800 | 3.0 | 10 | −770 | 2.9 | 10 |
| Comparative Example 4 | −810 | 2.3 | 10 | −770 | 2.3 | 10 |
| Comparative Example 5 | −800 | 2.1 | 5 | −780 | 2.1 | 5 |
| Comparative Example 6 | −810 | 2.0 | 5 | −780 | 2.0 | 5 |

Crystal forms of the titanyl phthalocyanine compounds obtained in Comparative Examples 3, 4, and 6 were compared with that of the crystal according to the present invention as follows.

Figure 9:
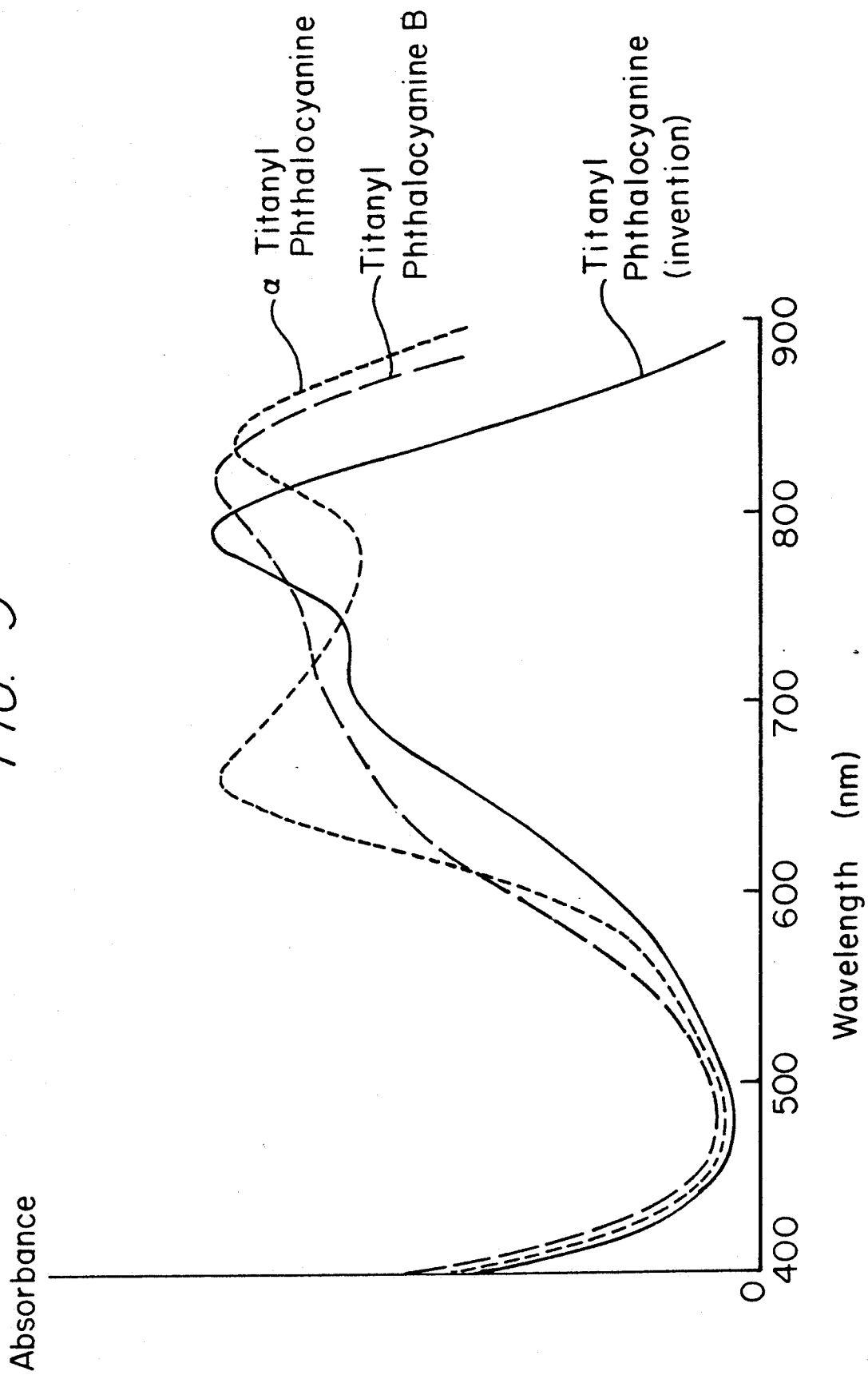
FIG. 9 shows absorption spectra of the titanyl phthalocyanine crystals obtained in Example 1 and Comparative Examples 3 and 5.

One part of each of α-titanyl phthalocyanine obtained in Comparative Example 3, titanyl phthalocyanine B obtained in Comparative Example 5, and titanyl phthalocyanine obtained in Example 1 was mixed with 1 part of polyvinyl butyral ("ESLEC BM-1") and 100 parts of cyclohexanone, and the mixture was dispersed in a paint shaker together with glass beads for 1 hour. The resulting coating composition was coated on a glass plate to a thickness of about 1 μm, followed by drying under heat. Absorption spectrum of each sample is shown in FIG. 9. It can be seen that the three samples are greatly different in absorbance particularly at wavelengths of 650 nm and 850 nm, which is believed attributed to the difference in crystal form.

Figure 10:
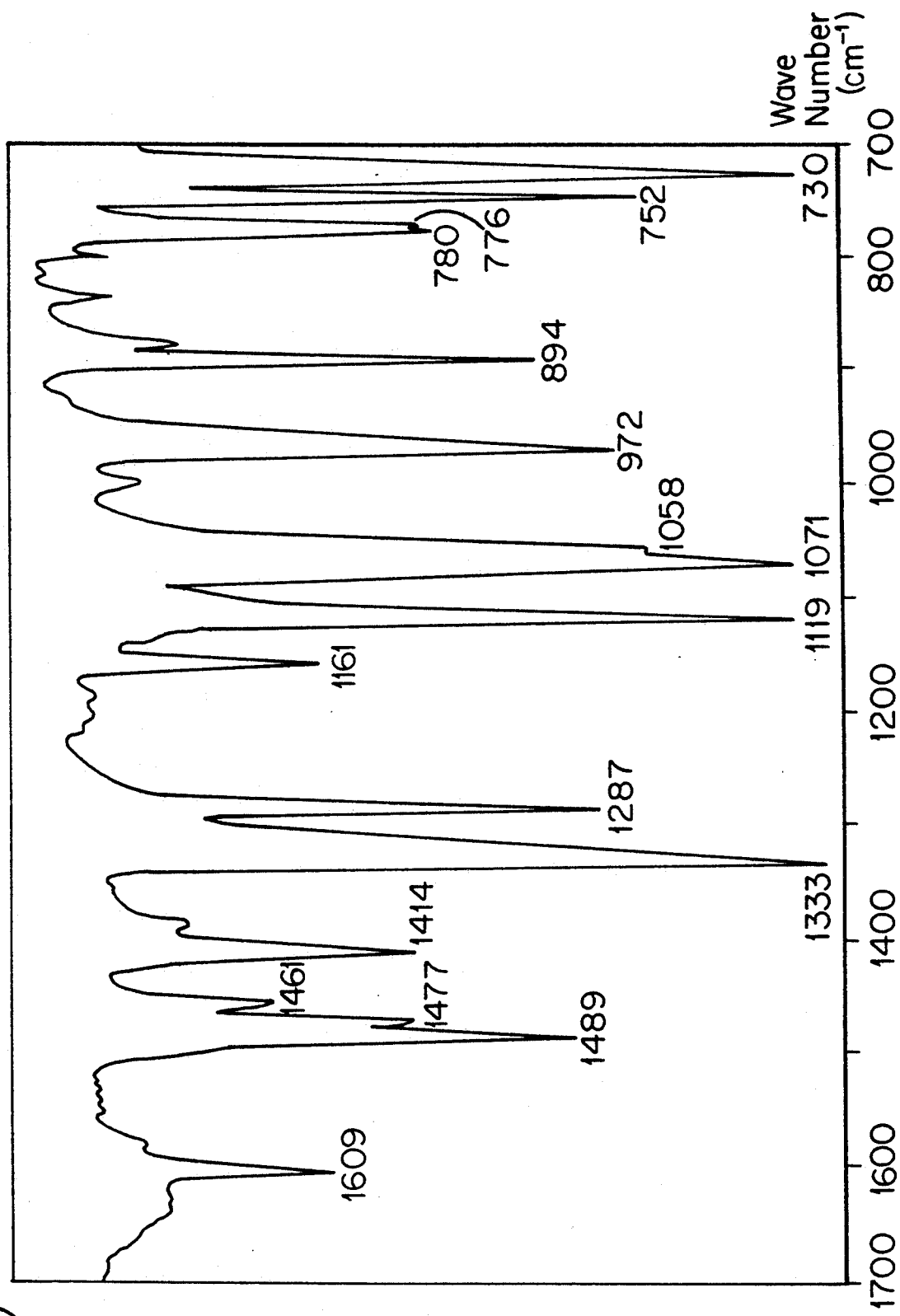
FIGS. 10 to 12 each shows IR spectra of the titanyl phthalocyanine crystals obtained in Example 1 and Comparative Examples 3 and 6.
Figure 11:
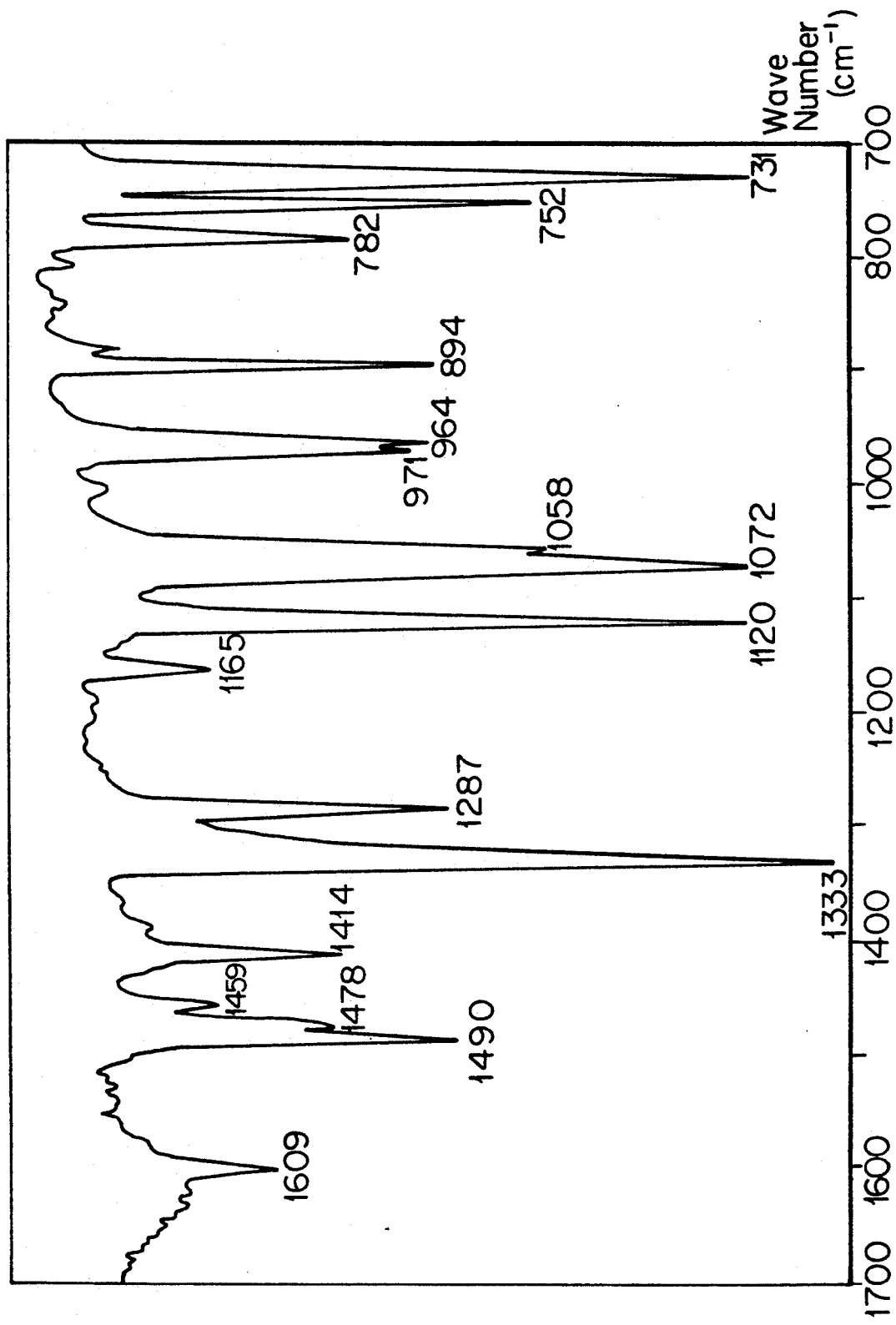
Figure 12:
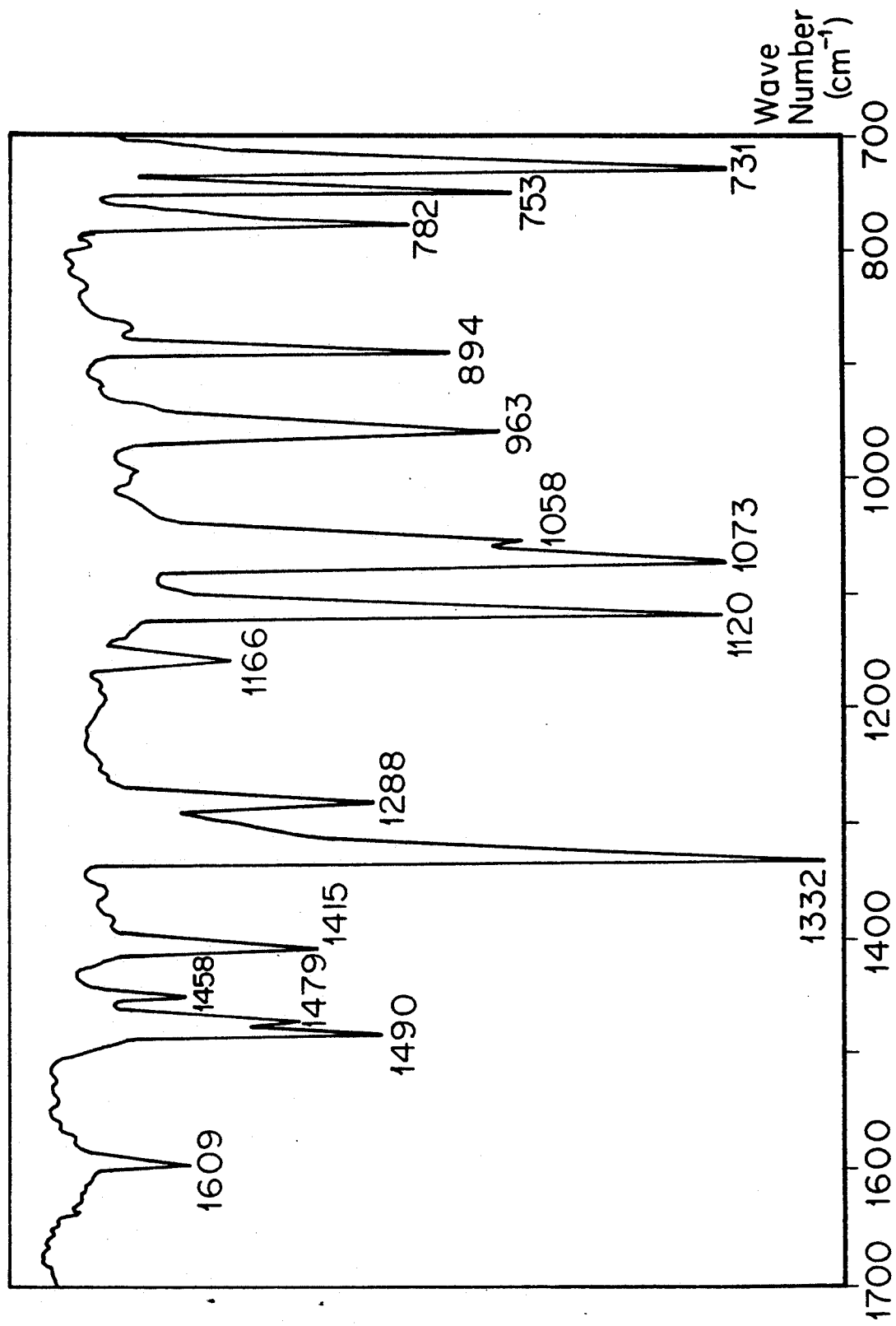

Then, IR spectrum of each of α-titanyl phthalocyanine obtained in Comparative Example 3, titanyl phthalocyanine C obtained in Comparative Example 6, and titanyl phthalocyanine obtained in Example 1 was determined, and the results are shown in FIGS. 10, 11, and 12, respectively. On comparing these spectra, it is revealed that titanyl phthalocyanine C shows a peak at 971 cm$^{-1}$ similarly to α-titanyl phthalocyanine while titanyl phthalocyanine of the present invention shows no peak at the same wavelength. Based on this result, the titanyl phthalocyanine of the present invention may be characterized as "substantially α-free." The difference in IR spectrum is considered attributed to a difference in interaction among phthalocyanine molecules which arises from a difference in crystal form.

As described above, the titanyl phthalocyanine crystal according to the present invention has a novel crystal form and exhibits photosensitivity in a wavelength region extending to the longer side and is therefore very useful as a photoconductive material of electrophotographic photoreceptors used in, for example, printers utilizing a semiconductor laser as a light source. The electrophotographic photoreceptor of the present invention using such a titanyl phthalocyanine crystal has high sensitivity and excellent durability on repeated use.

While the invention has been described in detail and with reference to specific examples thereof, it will be apparent to one skilled in the art that various changes and modifications can be made therein without departing from the spirit and scope thereof.

What is claimed is:

1. A substantially α-free titanyl phthalocyanine crystal showing diffraction peaks at Bragg angles (2θ±0.2) of 27.2°, 24.0°, 18.0°, 14.3° and 9.5° in X-ray diffractometry.

2. A photoconductive material for an electrophotographic photoreceptor which comprises a substantially α-free titanyl phthalocyanine crystal showing diffraction peaks at Bragg angles (2θ±0.2) of 27.2°, 24.0°, 18.0°, 14.3°, and 9.5° in X-ray diffractometry.

3. An electrophotographic photoreceptor comprising an electroconductive support having thereon a photosensitive layer containing a substantially α-free titanyl phthalocyanine crystal showing diffraction peaks at Bragg angles (2θ±0.2) of 27.2°, 24.0°, 18.0°, 14.3° and 9.5° in X-ray diffractometry.

4. An electrophotographic photoreceptor as in claim 3, wherein said photosensitive layer comprises a charge transporting layer and a charge generating layer comprising the titanyl phthalocyanine crystal and a binder resin.

5. An electrophotographic photoreceptor as in claim 4, wherein the weight ratio of the titanyl phthalocyanine crystal to the binder resin is from 40/1 to 1/10.

6. An electrophotographic photoreceptor as in claim 5, wherein the weight ratio of the titanyl phthalocyanine crystal to the binder resin is from 10/1 to 1.

7. An electrophotographic photoreceptor as in claim 4, wherein said charge transporting layer comprising a charge transporting material and a binder resin.

8. An electrophotographic photoreceptor as in claim 7, wherein said charge transporting material is selected from the group consisting of polycyclic aromatic compounds, nitrogen-containing heterocyclic compounds, pyrazoline compounds, hydrazone compounds, triphenylmethane compounds, triphenylamine compounds, enamine compounds, and stilbene compounds.

9. An electrophotographic photoreceptor as in claim 7, wherein the weight ratio of the charge transporting material to the binder resin is from 5/1 to 1/5.

10. An electrophotographic photoreceptor as in claim 3, wherein said photosensitive layer is a single layer comprising the titanyl phthalocyanine crystal, a charge transporting material and a binder resin.

11. An electrophotographic photoreceptor as in claim 10, wherein the weight ratio of the titanyl phthalocyanine crystal to the charge transporting material is from 1/10 to 10/1, and the weight ratio of the charge transporting material to the binder resin is from 1/20 to 5/1.

12. An electrophotographic photoreceptor as in claim 3, which further comprises a subbing layer provided between the electroconductive support and the photosensitive layer.

* * * * *